Nov. 15, 1966 W. A. BOOTHE ET AL 3,285,265

FLUID AMPLIFIER DEVICES

Filed April 17, 1964 2 Sheets-Sheet 1

Inventors
Willis A Boothe
Bert J. Czwakiel
by Paul A. Frank
Their Attorney

Inventors
Willis A. Boothe
Bert J. Czwakiel
by Paul A. Frank
Their Attorney

United States Patent Office 3,285,265

Patented Nov. 15, 1966

3,285,265
FLUID AMPLIFIER DEVICES

Willis A. Boothe, Scotia, and Bert J. Czwakiel, Schenectady, N.Y., assignors to General Electric Company, a corporation of New York Filed Apr. 17, 1964, Ser. No. 360,553
10 Claims. (Cl. 137—81.5)

Our invention relates to fluid operated control devices of the fluid amplifier type which employ no moving parts, and in particular, to improved fluid amplifier devices of the digital fluid controlled type wherein the operation thereof provides logic functions useful in digital computation circuits.

Fluid amplifiers are currently finding application as analog and digital computing elements, as well as other uses in the field of fluid power and control. Fluid amplifiers feature inherent reliability and essentially unlimited life span since generally they employ neither moving mechanical parts, thereby avoiding frictional wear, nor parts undergoing self-deterioration or dissipation in operation. Further, they can be produced at low cost due to their ease of fabrication from virtually any material that is nonporous and has structural rigidity. As a result, they are ideal for application where nuclear radiation, high temperature, vibration, and shock may be present. The devices will operate on both compressible fluids such as gases including air, and relatively incompressible fluids such as water or oil.

Fluid amplifiers fall into two basic categories, the digital type and the analog type. Since our own invention is directed to digital type fluid amplifiers, the description of fluid amplifiers hereinafter will be limited thereto.

The digital amplifier is generally a two position or on-off fluid operated control device. The distinguishing feature of the digital-type fluid amplifier from the analog-type amplifier is the provision in the fluid flow configuration defining the fluid flow paths in the digital amplifier of an interaction chamber defined by a pair of side walls diverging one from the other along at least a portion thereof in the direction of flow of a jet of pressurized fluid therein. The side walls may be designed to obtain momentum exchange or boundary layer (entrainment) action. In the momentum exchange type of action, a deflection of a first fluid jet is obtained by imparting sideways momentum thereto by means of a second fluid jet positioned in opposing relationship to the first jet and generally perpendicular thereto.

In the boundary layer type of action, an entrainment action is created comprising the trapping of fluid in regions between a side of the fluid jet and the adjacent side wall. The trapping of fluid reduces the pressure in the regions, creating pressure force on the fluid jet tending to deflect it toward such adjacent side wall. Even in the absence of a second fluid jet, turbulence effect in the first fluid jet creates an unbalanced condition in the forces acting thereon, causing the first jet to approach one or the other, but not both, of the side walls. The more closely the first jet approaches one of the side walls, the lower the pressure becomes in the region of the trapped fluid, whereby the inbalance in the forces increases and the jet is more strongly attracted to the given one of the side walls. The regenerative effect causes the jet to rapidly assume a stable state of deflection in which it is attached to one of the side walls for a substantial distance along the length thereof, substantially all of the fluid from the jet flowing into the fluid receiving passage associated with that side wall. The fluid jet remains attached to one or the other of the side walls in this manner, in the absence of a second fluid jet. To deflect the fluid jet from the receiver associated with a first side wall to which the jet is attached, to a second receiver associated with the oppositely disposed second side wall of the interaction chamber, a second fluid jet is directed against the side of the first jet in an amount sufficient to introduce fluid into the low pressure region of trapped fluid. The fluid from this second jet thus introduced increases the pressure in the region of the trapped fluid, thereby decreasing the effects of the entrainment action and progressively detaching the first jet from the first side wall. The second jet continues to be directed against the first jet thereby deflecting such first jet toward the second, or opposite, side wall. In an identical manner, the first jet experiences an entrainment action with the opposite side wall and becomes attached thereto, the receiver associated therewith receiving the flow of fluid from both the first and second jets. The flow of fluid in a digital-type fluid amplifier therefore responds to input fluid flows in a digital manner, that is, provides to a substantial degree, mutually exclusive flows of fluid to one or the other of the receivers, and therefore, at one or the other of the fluid outlets respectively communicating therewith. The mutually exclusive fluid flow or output fluid signal at the receivers may be maintained in a stable state by constructing the side walls of the interaction chamber of sufficient length. The fluid amplifiers of our invention, as described hereinafter, employ attachment only to one side wall.

By appropriate techniques, digital-type fluid amplifiers may be fabricated in a manner to perform various logic functions. In particular, an "exclusive OR" function and "AND" function may be performed by a "half-adder" fluid amplifier device in which first and second pressurized fluids are received at first and second fluid inlets. The first and second pressurized fluids are formed into first and second fluid jets, respectively, which, independently and exclusively of each other, proceed to be received in a first fluid receiving passage. The concurrent presence of both jets, however, effects a mutual interaction causing a joint deflection of the two jets for reception within a second fluid receiving passage. The "half-adder" device, therefore, provides an "exclusive OR" function indicated by a flow of pressurized fluid at a first fluid outlet which communicates with the first receiving passage and an "AND" function indicated by a flow of pressurized fluid at a second fluid outlet which communicates with the second receiving passage. A fluid operated control device of this type is disclosed in U. S. Patent 3,107,850 to Warren et al. The device disclosed in FIGURE 2 of such patent has several undesired operating characteristics such as being load sensitive, that is, becoming unstable and switching the output fluid signal from an operatively predetermined receiving passage to the other one or distributing such fluid signal between the two receiving passages, at flows approaching full load conditions; switching the flow of fluid at the receivers of the preceding fluid amplifier stage at times other than that determined by normal (unbiased) operating conditions due to the generation of undesired back pressures therein as caused by an interaction in the concurrent presence of two jets in the half-adder fluid amplifier stage; and, normal steady state operation occurring about a bias pressure point as distinguished from the desired zero pressure operating point.

Therefore, one of the principal objects of our invention is to develop a fluid logic component comprised by an improved fluid amplifier of the digital type.

Another important object of our invention is to develop a fluid logic component comprised by an improved fluid amplifier of the digital type having two fluid inputs.

Still another object of our invention is to develop a fluid logic component comprised by an improved amplifier of the digital type having three fluid inputs.

A still further object of our invention is to develop a fluid logic component comprised by an improved fluid amplifier of the digital type constructed from a plurality of thin laminations.

Briefly stated, our invention provides an improved fluid operated control device in the form of a digital-type fluid amplifier which has stable operating characteristics over the full range of fluid flow through the device. The stable operating characteristics are obtained by a fluid amplifier construction comprising an interaction chamber defined by a pair of side walls wherein a first of the side walls has a first surface parallel to the centerline axis of the device and a downstream second surface disposed in diverging relationship to such axis. The second side wall is disposed on the opposite side of the centerline axis and has a curved first surface and a downstream second surface disposed in diverging relationship to the axis. At least two fluid passages are in communication with the upstream end of the interaction chamber such that a first and second fluid passage are in communication with the first surface of the first and second side wall, respectively. The two fluid passages each terminate in a fluid flow restrictor for generating jets of fluid in directions approximately perpendicular to each other. The fluid flow restrictors are positioned such that the generation of back pressure in the vicinity of the restrictors is substantially avoided and thus prevents undesired biasing or switching of preceding fluid amplifier stages. A pair of spaced fluid receiving passages are positioned downstream from the side walls of the interaction chamber for selectively receiving fluid from a jet attached to or impinging upon an associated side wall of the chamber. A barrier positioned intermediate the fluid receiving passages creates a vortex of the received fluid and flows in a direction to maintain attachment or impingement of the fluid jet on a selected side wall of the interaction chamber over the full range of fluid flow. Finally, a pair of oppositely disposed vent passages are open intermediate the side walls of the interaction chamber and fluid receiving passages for relieving fluid pressure in the receiving passages whereby at high levels of loading or fluid flow within the fluid amplifier any excess fluid which cannot pass through a selected fluid receiving passage is diverted by the barrier and thence into the vent passages, resulting in a mutually exclusive output fluid signal in the selected receiving passage and fluid outlet communicating therewith. The features of our invention which we desire to protect herein are pointed out with particularity in the appended claims. The invention itself, however, both as to its organization and method of operation, together with further objects ad advantages thereof, may best be understood by reference to the following description taken in connection with the accompanying drawings, wherein like parts in each of the several figures are identified by the same reference character, and wherein:

Figure 1:
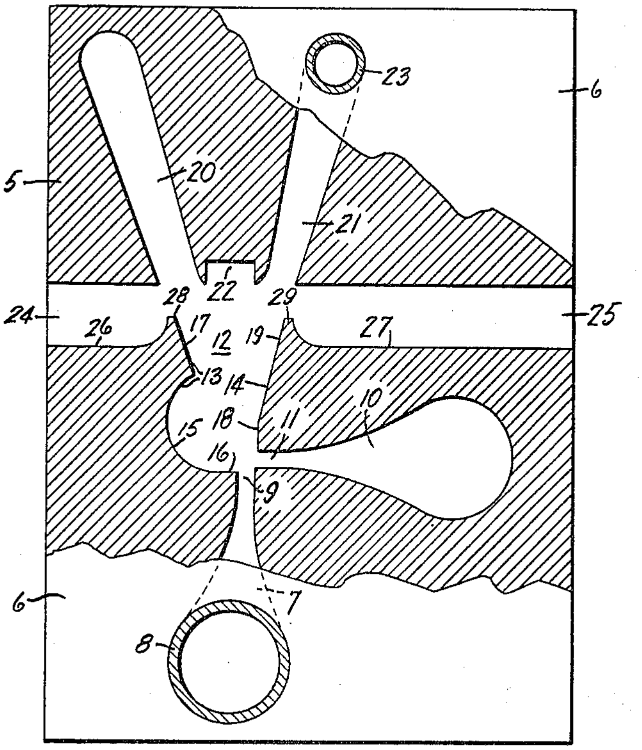
FIGURE 1 is a plan view of a digital fluid amplifier constructed in accordance with our invention having a cover plate containing fluid inlet and outlet means wherein the cover plate is partly broken away to illustrate the amplifier fluid flow configuration.

Conventional fluid amplifiers comprise a structure that is constructed from at least two elements, a base member wherein a fluid flow configuration is provided, and a flat cover member attached thereto for confining the fluid flow within paths defined by the configuration and the enclosing surface of the cover member. Referring now to the drawings, there is illustrated in FIGURE 1 a first embodiment of a digital-type fluid amplifier constructed in accordance with our invention. The fluid amplifier includes a base member 5 comprised by a flat plate formed of any suitable nonporous structurally rigid material, such as metal, glass, plastic, or the like, which is slotted in a special configuration to provide passages for fluid. The fluid flow is confined within the slots by means of a suitable enclosure such as cover plate 6 shown partly broken away. Such cover plate is held in fluid-tight arrangement with base member 5 by any of a number of suitable means such as, for example, screws, clamping means, and adhesive materials. The slots which define the fluid passages are preferably rectangular in cross section.

The particular fluid amplifier illustrated in FIGURE 1 comprises a first fluid flow passage 7 defined by a slot within plate 5. A fluid inlet means for supplying fluid to passage 7 comprises a conduit 8 shown in cross section as extending in a direction generally perpendicular to the plane of cover plate 6 and being threaded or otherwise connected into a hole therein to provide a fluid-tight connection. Thus, a first end of fluid passage 7 is in fluid communication with a source of pressurized fluid (not shown) by means of conduit 8. Alternatively, passage 7 may extend outwardly within plate 5 to an edge thereof and conduit 8 is connected at such point. The second end of passage 7 terminates in a fluid flow restrictor, that is, a restricted portion of the slot 7 forming a nozzle 9 adapted to generate a first jet of fluid issuing therefrom. A second fluid passage 10 is supplied at a first end thereof from a second source of pressurized fluid by means of a second conduit connected in a second hole in plate 6 (not shown). The second end of passage 10 terminates in a fluid flow restrictor 11 for generating a second jet of fluid in a direction substantially perpendicular to the direction of the first jet. The two sources of pressurized fluid may comprise outputs of preceding stages of fluid amplifiers in a digital computation circuit.

An interaction chamber, designated as a whole by numeral 12, is provided adjacent the origin of the first and second jets of fluid generated by fluid flow restrictors 9 and 11, respectively. Chamber 12 is defined by a pair of side walls 13 and 14 disposed on opposite sides of the centerline axis of the fluid amplifier. The centerline axis is herein defined as running vertically through the center of an indentation 22 and substantially through the center of conduit 8. The first side wall 13 has a first portion comprising a curved surface 15, generally cusp shaped, wherein an upstream end 16 thereof is offset slightly in an upstream direction from the upstream side wall 33 defining flow restrictor 11. Upstream is herein defined as that part of an element closer to conduit 8, as distinguished from the downstream part further removed from conduit 8. The second portion of side wall 13 comprises a flat surface 17 in diverging relationship to the centerline axis of the amplifier at a relatively large angle thereto. The second side wall 14 of interaction chamber 12 comprises a first portion 18 having a flat surface parallel to the centerline axis of the amplifier and a downstream second flat surface 19 in diverging relationship to the centerline axis at a relatively small angle thereto. Surface 18 of side wall 14 is offset slightly from the path described by a fluid jet issuing from flow restrictor 9 whereby such fluid jet is not in direct communication with surface 18. The axis of fluid flow restrictor 9 is preferably disposed at a small angle relative to the centerline axis of the amplifier such that restrictor 9 is inclined slightly toward surface 18 of side wall 14. Similarly, restrictor 11 is preferably inclined slightly away from the upstream end 16 of side wall 13.

A pair of spaced fluid receiving passages 20 and 21 are positioned on opposite sides of the centerline axis of the amplifier downstream from the side walls of interaction chamber 12 for selectively receiving fluid from fluid jets generated by and issuing from restrictors 9 and/or restrictor 11. The width dimensions of the entrances to the two receiving passages may be equal, but the entrance to passage 20 is preferably made slightly larger to obtain equal pressures of the mutually exclusive output fluid signals in the receiving passages. Each receiving passage is associated with a particular side wall of chamber 12. Thus, receiver 20 is associated with side wall portion 17, and receiver 21 with side wall portion 19. Each receiving passage has a pair of side walls, with the side walls furthest removed from the centerline axis of the amplifier being substantially, although not exactly, aligned with the respective downstream surface of the associated side wall of interaction chamber 12. The angular relationship of the diverging second portions of side walls 13 and 14 is also maintained in the orientation of fluid receiving passages 20 and 21 such that the side walls of passage 20 are disposed at a greater angle from the centerline axis of the amplifier than the side walls of passage 21.

A barrier means is positioned between fluid receiving passages 20 and 21 in the form of an indentation 22 having a width dimension at least twice as great as the width of either fluid flow restrictor 9 or 11, and a depth dimension at least as great as the width of either restrictor. The preferable configuration of indentation 22 is rectangular, although other forms such as triangular and semicircular may also be employed.

Fluid receiving passages 20 and 21 communicate through associated fluid outlet means provided in cover plate 6 to supply the respective output fluid signals within one or the other of the receiving passages to a suitable load device such as a valve or succeeding fluid amplifier stage. One of the fluid outlet means is shown in cross section in FIGURE 1 as conduit 23 passing into cover plate 6 and it is to be understood that a similar conduit is provided at the far end of receiving passage 20. The fluid outlet connections from receivers 20 and 21 may be of the same construction as the fluid inlet connections to fluid passages 7 and 10.

A pair of oppositely disposed vent passages 24 and 25 are positioned intermediate the interaction chamber side walls and the entrances to receiving passages 20 and 21, respectively. Each of the vent passages 24 and 25 is defined by a pair of side walls. The upstream side walls 26 and 27 of vent passages 24 and 25, respectively, each include a surface extending in a downstream direction to form lip members 28 and 29. Vent passages 24 and 25 extend outwardly to the edge of base member 5 to provide communication either to the atmosphere or a return path to a pressurized fluid supply as desired. Alternatively, vent passages 24 and 25 may not extend to the edges of base member 5 and are provided with outlet connections through cover plate 6 in the manner described for receiving fluid passages 20 and 21.

Figure 4:
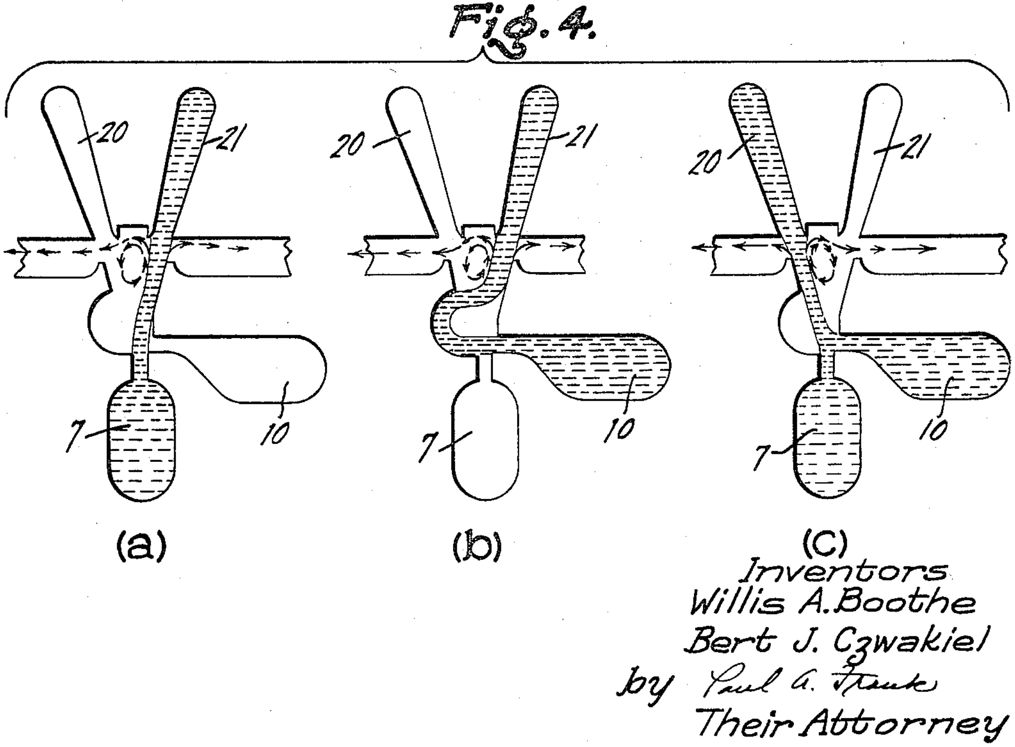

The operation of our fluid amplifier device will now be described with relation to FIGURES 1 and 4. Assuming that pressurized fluid is initially supplied exclusively to inlet connection 8, a first jet of such fluid is formed in passing through restrictor 9 and, due to the entrainment process hereinabove explained, becomes attached to the portion 19 of side wall 14 of the interaction chamber and thence directed exclusively into associated fluid receiving passage 21, finally flowing throughout outlet means 23. The first fluid jet remains attached to side wall 14 as illustrated in FIGURE 4*a* until such time that a fluid flow is introduced through passage 10 to generate a second fluid jet concurrently with the first jet. FIGURE 4*a* also indicates that the first jet is not in direct communication with portion 18 of side wall 14 due to the offset construction thereof.

Now assuming that pressurized fluid is supplied exclusively to fluid passage 10, a fluid jet is generated by such fluid passing through restrictor 11. The fluid jet is directed along the curved surface 15 of side wall 13 and at the downstream end thereof is deflected to surface 19 of side wall 14 and attaches thereto, resulting in an exclusive fluid flow in receiving passage 21 as illustrated in FIGURE 4*b*.

Figure 2:
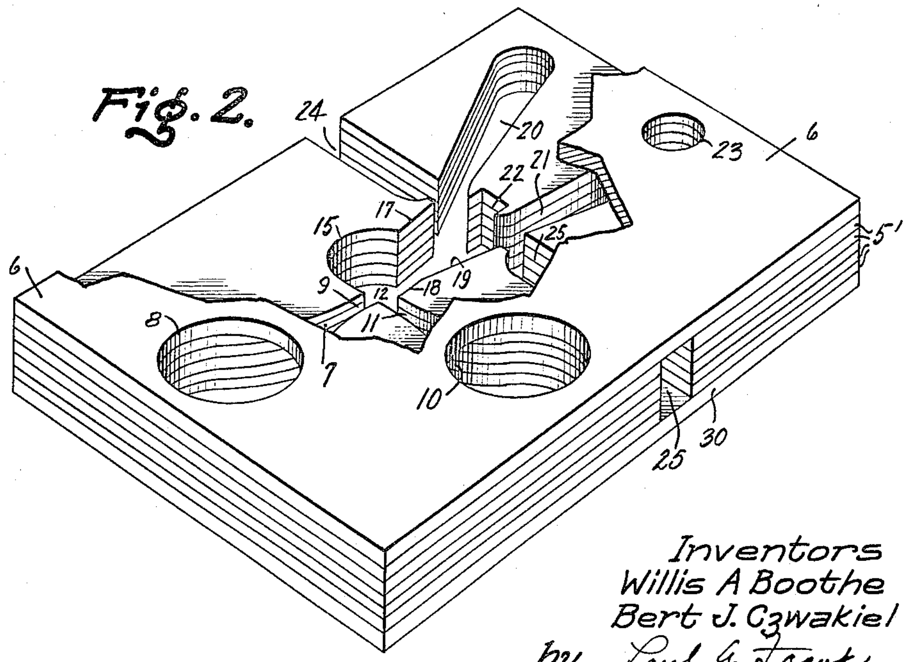
FIGURE 2 is a perspective view of a digital fluid amplifier similar to that shown in FIGURE 1, but constructed of a plurality of laminations.

Finally, assuming that pressurized fluid is supplied concurrently to passages 7 and 10, a mutual interaction of the two jets of fluid within interaction chamber 12 causes a joint deflection of the two jets whereby a resultant fluid jet is formed which impinges but does not attach upon downstream surface 17 of side wall 14 and thence directed exclusively into fluid receiving passage 20 as shown in FIGURE 4*c*. The fluid amplifier device illustrated in FIGURES 1, 2 and 4 is generally designated as a "half-adder" fluid logic device and performs both an "exclusive OR" logic function and an "AND" function. The first and second flows of fluid which are formed into first and second fluid jets, respectively, independently and exclusive of each, proceed to be received in a first receiving passage 21 and thus the half-adder device provides an exclusive OR function. The concurrent presence of both fluid jets, however, effects a mutual interaction causing a joint deflection of the two jets for reception within the second receiving passage 20 and thereby provides an AND function. It should thus be evident that the exclusive presence of an inlet fluid flow in passage 7 or 10 produces an exclusive output fluid signal which may be an outlet fluid flow in passage 21 and this outlet flow is switched exclusively to passage 20 by providing the concurrent presence of inlet flows in passages 7 and 10. Similarly, an exclusive outlet flow in passage 20 is switched exclusively to passage 21 by removing one of the two concurrent inlet flows in passages 7 and 10.

The offset position of the upstream end 16 of side wall 13 from the upstream side of restrictor 11 and the slight inclination of the axis of such restrictor away from end 16 both operate to prevent fluid in a jet generated by restrictor 11 from being partially diverted into fluid passage 7. The absence of fluid diversion into passage 7 avoids build up of undesired back pressure therein and thus prevents biasing of a preceding fluid logic stage having an outlet thereof connected to the inlet connection 8. The fluid amplifier constructed in accordance with our invention, therefore, provides a fluid logic circuit wherein the preceding stage operates in its desired manner independently of the action of the succeeding stage. Such desired operation is not obtainable with the amplifier described in the heretofore mentioned Warren et al. patent. In like manner, the offset position of surface 18 of side wall 14 from the near side of restrictor 9, and the slight inclination of the axis of such restrictor toward surface 18 both operate to prevent fluid in a jet generated by restrictor 9 from being partially diverted into passage 10. The offset and angular positions of restrictors 9 and 11 also prevent biasing of a preceding fluid logic stage in a vacuum direction, such condition occurring with the previously known half-adder in the presence of a single input fluid flow. Further, the offset and angular position of restrictor 9 ensures attachment to surface 19 of side wall 14 of a jet generated exclusively by restrictor 9. The positive attachment of the jet to surface 19 provides a more stable operation of our fluid amplifier than that obtainable with the heretofore mentioned Warren et al. amplifier.

The surface 17 of interaction chamber 12 is at a greater angle of divergence from the centerline axis of the amplifier than is surface 19 to ensure that a jet will not be attached, but merely impinge upon surface 17 in the presence of two input fluid flows and thus will switch to surface 19 upon a subsequent absence of one of the two input flows. Such greater angle also ensures that in the presence of a ingle jet issuing from restrictor 11 the jet will be entirely diverted to surface 19 from curved surface 15.

The barrier comprised by rectangular indentation 22 serves to establish what may be described as a latching vortex of a small portion of fluid of a jet impinging on the side wall portion 17 or attached to side wall portion 19. The indentation is dimensioned such that at least a portion of fluid leaving the indentation enters the adjacent vent passages without becoming part of the vortex. The effect of an established vortex flow in the direction indicated by the arrows in FIGURE 4 is to compress a fluid jet further against the side wall of the interaction chamber along which the jet is flowing resulting in both improved jet stability and an appreciable increase in the fluid pressure recovered in the particular fluid receiving passage receiving such jet as compared with thta obtainable without the indentation. Further, as illustrated in FIGURE 4, the vortex action prevents excess fluid from spilling over into the other receiving passage under heavy loading conditions wherein the desired receiving passage is unable to accommodate the total flow. It should be noted in FIGURE 4 that any excess fluid flows through both vents for either mode of jet flow within the interaction chamber. Indentation 22 thus coacts with vent passages 24 and 25 to ensure stable operation of the fluid amplifier over the full range of fluid pressure and flow. The vent passages provide paths for any excess fluid during the more highly loaded operating conditions of the fluid amplifier and relieve fluid pressure which may build up in the fluid receiving passages, thereby further providing a stabilizing effect for the jet and further improving the pressure recovery of the fluid received exclusively in the desired receiving passage. Lip members 28 and 29 positioned at the upstream inner ends of vent passages 24 and 25, respectively, provide sufficient length to the side walls of interaction chamber and aid the venting of any fluid otherwise tending to flow to the nonselected receiving passage thereby ensuring exclusive flow within the selected receiving passage. Thus, the combination of vent passages 24, 25 and lip members 28 and 29 provide a stable operation not attainable in the amplifier described in the above-identified patent under all conditions and especially under the condition of a blocked load. This is the circumstance where a receiving passage is completely closed off.

Figure 3:
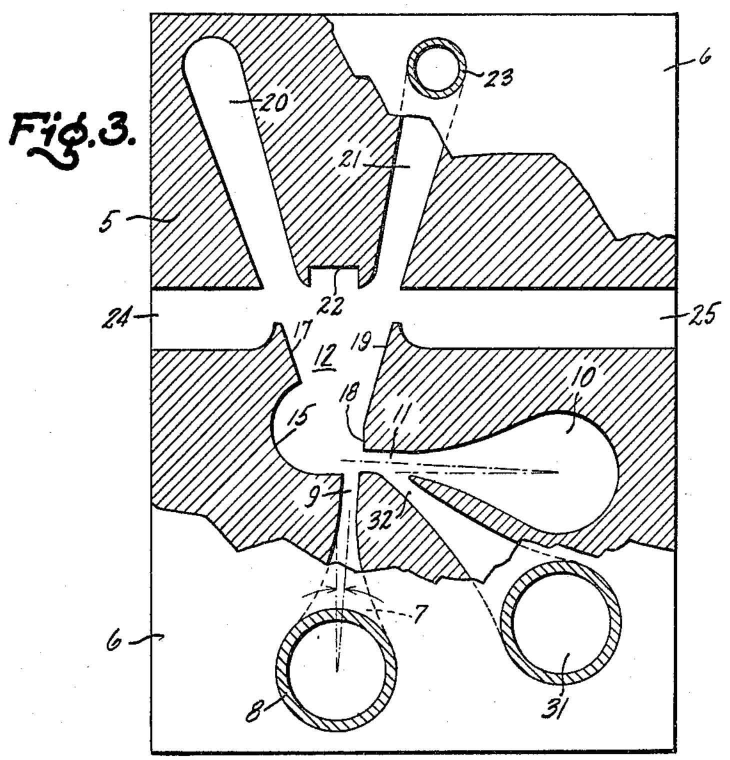
FIGURE 3 is a plan view of a second embodiment of a digital fluid amplifier having three fluid inputs as distinguished from the two fluid inputs in the devices of FIGURES 1 and 2; and FIGURES *4a*, *4b* and *4c* illustrate the fluid flow paths through the device shown in FIGURES 1 and 2 for various combinations of input fluid flows.

FIGURE 2 illustrates a fluid amplifier device having the identical fluid flow configuration as shown in the fluid amplifier of FIGURE 1, however, the FIGURE 2 fluid flow paths are formed of a plurality of relatively thin laminations as distinguished from the single base member 5 employed in FIGURE 1. Thus, a fluid flow configuration having a rectangular cross section is provided by employing a plurality of relatively thin laminations punched through with a particular fluid flow configuration. A predetermined number of the punched-through laminations are superposed between two unpunched laminations which may be thicker, as shown, or of the same thickness as the intermediate punched-through laminations. The laminations are fastened together in a suitable manner such as by adhesive, diffusion bonding, or brazing to form a unitary structure. In contradistinction, the fluid amplifiers illustrated in FIGURES 1 and 3 are fabricated by techniques such as photoetching in glass or plastic, molding and machining and each amplifier generally comprises a single base member containing the fluid flow configuration and a cover member. However, to produce a plurality of fluid fluid amplifiers having identical configurations of fluid flow paths described in single base members, but differing in flow capacities, necessitates further fabrication steps, resulting in an economically inefficient method for large scale production. Since one of the chief advantages of fluid amplifiers should be their very low cost, an economically practical method for fabricating fluid amplifiers which have identical arrangements of fluid flow paths and differ only in flow capacity comprises the fabrication thereof from a predetermined numbers of punched-through laminations containing the fluid flow configuration to thereby obtain the desired flow capacity. Thus, a smaller number of laminations are employed for the smaller flow capacity or lower fluid pressure amplifiers and a greater number of laminations employed for the higher flow capacity or fluid pressure devices.

The sizes of fluid amplifiers are conventionally designated in terms of the width dimension of the fluid flow restrictors. Small size amplifiers have restrictor widths from 0.005 to 0.020 inch, medium size amplifiers from 0.020 to 0.100 inch, and large size amplifiers from 0.100 inch upward. The fluid amplifiers having restrictor widths greater than 0.010 inch are especially adapted to be fabricated from thin laminations as illustrated in FIGURE 2. The thickness of the laminations including the fluid flow configuration may conveniently be from 0.003 to 0.005 inch, although this range is not to be construed as a limitation. The thin laminations having the punched-through fluid flow configuration are designated in FIGURE 2 by numeral 5'. The top relatively thick lamination 6 is equivalent to cover member 6 shown in FIGURE 1 and has the appropriate inlet and outlet holes 8 and 23, respectively, punched therethrough for providing suitable connections for passage of fluid to and from the device. A relatively thick bottom lamination 30 is employed to enclose the fluid paths defined by top lamination 6 and intermediate laminations 5'. The half-adder illustrated in FIGURE 2 operates in an identical manner as the device illustrated in FIGURE 1.

The fluid amplifier illustrated in FIGURES 1 and 2 is operable in a stable condition as a half adder device over a relatively wide range of pressures of input fluids. An output fluid signal will remain exclusively in receiving passage 20 over a pressure range of $0.25P_{10}<P_7<2.5P_{10}$ wherein $P_7$ and $P_{10}$ are the fluid pressures within passages 7 and 10, respectively. An output fluid signal will remain exclusively in receiving passage 21 over a pressure range of $4P_{10}<P_7<0.1P_{10}$.

By way of example, a particular fluid amplifier constructed in accordance with our invention has the following dimensions hereinabove described. Restrictors 9 and 11 terminate in nozzles each having a width of 0.040 inch; the axes of restrictors 9 and 11 are disposed at 2° and 1°, respectively, to the centerline axis of the amplifier; surface 18 is offset from the near side wall of restrictor 9 by 0.036 inch; and surfaces 17 and 19 diverge from the centerline axis of the amplifier at angles of 16° and 9°, respectively.

FIGURE 3 illustrates a fluid amplifier device having three input fluid passages as distinguished from the devices having two fluid inputs in FIGURES 1 and 2. In particular, the fluid amplifier shown in FIGURE 3 is provided with a third fluid passage 31 which is adapted to be supplied from a source of pressurized fluid in the same manner as fluid passages 7 and 10, it being understood that each of the three passages 7, 10, and 31 are supplied from different sources which may comprise the outlets of preceding stages of fluid logic elements. Fluid passage 31 terminates in a fluid flow restrictor 32 to generate a fluid jet issuing therefrom. Restrictor 32 is in communication with restrictor 11 intermediate the ends thereof at a small angle relative to the centerline axis of restrictor 11 such that minimum turbulence is introduced within restrictor 11 in the presence of a fluid jet issuing from restrictor 32. The three-input device illustrated in FIGURE 3 operates in a manner similar to the devices illustrated in FIGURES 1 and 2. Thus, mutually exclusive output fluid signals such as flows of pressurized fluid are obtained at either one or the other of the spaced fluid receiving passages 20 and 21 and such mutually exclusive flow is maintained in a stable state in accordance with the following possible combinations of inlet fluid flows supplied to fluid passages 7, 10 and 31. In the presence of a single fluid flow in any one of passages 7, 10, 31, or concurrent fluid flow in passages 10 and 31, the fluid flow path is that illustrated in FIGURES 4*a* and 4*b* wherein a mutually exclusive flow of pressurized fluid is provided in receiving passage 21. A concurrent fluid flow in passage 7 and either, or both, of passages 10 and 31 results in a mutually exclusive flow of pressurized fluid in fluid receiving passage 20. The modes of operation can be switched from one mode to the other by supplying the particular inlet fluid flows required to obtain the new mode of operation. The output of the three input device illustrated in FIGURE 3 is, as in the case of the devices of FIGURES 1 and 2, digital in nature but not bistable since the mode of operation wherein fluid is received mutually exclusively in receiving passage 20 will not be maintained by a subsequent absence of fluid flow within passage 7 (or both of passages 10 and 31) but will automatically switch the flow from receiving passage 20 to 21.

The devices shown in FIGURE 1 (or 2) and FIGURE 3 may be combined in circuit relationship to provide a "full-adder" logic function. Thus, the outlet of receiving passage 21 of a two input device shown in FIGURE 1 (or 2) is connected to the inlet of passage 7 of a three input device shown in FIGURE 3. Two input fluid signals to be added are supplied to the two inlets to passages 7 and 10 of the two input device, and binary carries from previous stages are supplied to the two side inlets 10 and 31 of the three input device. The sum is provided at the output of passage 21 of the three input device and binary carries from previous bits of information are provided at the outputs of passages 20 of the two and three input devices.

From the foregoing description, it can be appreciated that our invention makes available improved fluid operated control devices which employ no moving parts and provide specific logic functions of a digital nature. Such devices find application in the field of digital computation. Our devices have the advantage of maintaining desired stable operating characteristics regardless of the load imposed on the outputs of the devices. Our devices have a further advantage over known fluid amplifier devices in that undesired pressure biasing of a preceding fluid amplifier stage is avoided, thereby preventing switching of the mode of operation of such preceding stage at an improper time and permitting normal steady state operation about the desired zero pressure operating point. Further, the outlets of our devices have mutually exclusive output fluid signals without any interaction therebetween. Finally, our devices obtain considerably higher pressure recoveries of the fluid within the output receiving passages. Our devices thus provide operating characteristics which are considerably superior to those obtained with previously known fluid amplifier devices of the same general type.

Having described three embodiments of an improved digital type fluid amplifier, it is believed obvious that other modifications and variations of our invention are possible in the light of the above teachings. For example, multi-inputs comprising two, three, or any other desired number of inputs may be provided in the manner illustrated in FIGURE 3, and such multi-inputs may terminate in common or separate nozzles. It is, therefore, to be understood that changes may be made in the particular embodiments of our invention described which are within the full intended scope of the invention as defined by the following claims.

What we claim as new and desire to secure by Letters Patent of the United States is:

1. A fluid-operated control device comprising a chamber defined by a pair of side walls, a first of said side walls having a first surface thereof parallel to the centerline axis of said device and a downstream second surface disposed in diverging relationship to the centerline axis at a relatively small angle, a second of said side walls disposed on the opposite side of the centerline axis from said first side wall and having a curved first surface and a downstream second surface disposed in diverging relationship to the centerline axis at a relatively large angle, a first fluid passage terminating in a first fluid flow restrictor in communication with said first side wall for generating a first jet of fluid in a direction along the downstream surface of the first side wall, a second fluid passage terminating in a second fluid flow restrictor in communication with said second side wall for generating a second jet of fluid in a direction generally perpendicular to the direction of the first jet and along the curved surface of said second side wall, the side walls of said chamber establishing regions which effect attachment of a jet of fluid to the downstream surface of said first side wall in the presence of a single one of the first and second jets to provide stable operation of the device, and impingement upon the downstream surface of said second side wall in the concurrent presence of the first and second jets wherein the greater angle of divergence of the downstream second surface of said second side wall insures that the jets will not be attached thereto and thereby permit switching of the fluid flow upon a subsequent absence of one of the two jets, a pair of spaced fluid-receiving passages downstream from said side walls for selectively receiving mutually exclusive fluid signals from the generated jets of fluid, a pair of oppositely disposed vent passages open at areas intermediate the side walls and receiving passages for relieving fluid pressure in said receiving passages, each vent passage defined by an upstream and downstream side wall wherein the upstream sidewall is provided with a surface extending in a downstream direction to form a lip member which provides sufficient length to the side walls of the chamber and aids in venting of any fluid tending to flow to a non-selected receiving passage thereby insuring exclusive flow within the selected of the receiving passages, and a barrier downstream from said chamber with an end face confronting said chamber, said barrier disposed symmetrically about the centerline axis of said device intermediate said fluid-receiving passages and comprising an indentation for receiving fluid from the generated jets and creating a vortex of the received fluid flowing in a direction to maintain attachment of a jet of fluid to said first side wall of said chamber in the presence of a single one of the first and second jets and maintain impingement of a jet to said second side wall in the presence of both jets said indentation being dimensioned such that at least a portion of fluid leaving the indentation enters the adjacent vent passages without becoming part of the vortex.

2. A device as defined in claim 1 wherein said barrier comprises a rectangular indentation.

3. A device as defined in claim 2 wherein said identation has a width dimension at least twice as great as the width of the first fluid flow restrictor.

4. A device as defined in claim 2 wherein said identation has a depth dimension at least as great as the width of the first fluid flow restrictor.

5. A fluid-operated control device comprising a chamber defined by a pair of side walls, a first of said side walls having a first surface thereof parallel to the centerline axis of said device and a downstream second surface disposed in diverging relationship to the centerline axis at a relatively small angle, a second of said side walls disposed on the opposite side of the centerline axis from said first side wall and having a curved first surface and a downstream second surface disposed in diverging relationship to the centerline axis at a relatively large angle, a first fluid passage terminating in a first fluid flow restrictor for generating a first jet of fluid in a direction along the downstream surface of the first side wall, said first restrictor positioned at a small angle in diverging relationship to the centerline axis of said device to prevent generation of undesired back pressure in a preceding fluid-amplifier adapted to be connected in circuit relationship with said fluid-operated control device, a second fluid passage defined by an upstream and downstream side wall and terminating in a second fluid flow restrictor for generating a second jet of fluid in a direction generally perpendicular to the direction of the first jet and along the curved surface of said second side wall, said second fluid passage upstream side wall offset slightly in a downstream direction from the upstream end of the curved surface of said second side wall to further prevent generation of undesired back pressure in a preceding fluid amplifier, the side walls of said chamber establishing regions which effect attachment of a jet of fluid to the downstream surface of said first side wall in the presence of a single one of the first and second jets, and mere impingement upon the downstream surface of said second side wall in the concurrent presence of the first and second jets, a pair of spaced fluid-receiving passages downstream from said side walls for selectively receiving mutually exclusive fluid signals from jets associated with corresponding side walls of said chamber, said receiving passages positioned on opposite sides of the centerline axis of said device, each of said receiving passages having a pair of side walls wherein the side wall of each receiving passage furthest removed from the centerline axis of the device being substantially aligned with the second surface of the corresponding side wall of said chamber, a pair of oppositely disposed vent passages open at areas intermediate the chamber side walls and receiving passages for relieving fluid pressure in said receiving passages, each of said vent passages having a pair of side walls with an upstream side wall thereof having a curved surface extending in a downstream direction at a first open end of the vent passage, and barrier means positioned between said fluid-receiving passages for receiving fluid from jets associated with the chamber side walls and creating a vortex of the received fluid flowing in a direction to maintain association of a jet of fluid with a selected side wall of said chamber over the full range of fluid flow through the device and thereby ensuring mutually exclusive fluid signals at said fluid-receiving passages.

6. A device as defined in claim 5 wherein the width dimension of entrances to the fluid-receiving passages are unequal.

7. A device as defined in claim 6 wherein the width dimension of the entrance to the fluid-receiving passage adjacent the second side wall of said chamber is greater than the corresponding dimension of the remaining fluid-receiving passage whereby the mutually exclusive fluid signals received in each of the receiving passages have equal fluid pressure.

8. A fluid-operated control device comprising a relatively thick top lamination composed of a nonporous structurally rigid material, fluid entrance and exit means disposed within said top lamination, a predetermined number of relatively thin intermediate laminations composed of said material, said thin laminations each characterized by an opening therethrough, each said opening defining a similar fluid flow configuration comprising first fluid passage means for generating a first jet of fluid second fluid passage means for generating a second jet of fluid in a direction generally perpendicular to the direction of the first jet, a chamber adjacent the origin of a first and second jet generated by said first and second means, respectively, and defined by a pair of side walls, a first of said side walls having a curved surface and a downstream second surface disposed in diverging relationship to the centerline axis of said device at a relatively large angle, a second of said side walls having a first surface parallel to the centerline axis and a downstream second surface disposed in diverging relationship to the centerline axis at a relatively small angle, said side walls establishing regions which effect impingement of a jet of fluid upon the downstream second surface of said mere first side wall in the concurrent presence of the first and second jets, and attachment to the downstream second surface of said second side wall in the presence of one of the first and second jets, fluid-receiving means downstream from said side walls for receiving mutually exclusive fluid signals from jets associated with correponding side walls of said chamber, a pair of oppositely disposed vent passages for relieving fluid pressure in said receiving means, each of said vent passages having a pair of side walls with an upstream side wall thereof having a curved surface extending in a downstream direction at a first open end of the vent passage, and, identation means positioned between said fluid-receiving means for creating a vortex of the received fluid flowing in a direction to maintain association of a jet of fluid with a selected side wall, said thin laminations superposed in congruent relationship, said fluid entrance and exit means positioned adjacent the ends of fluid flow paths defined by said first fluid passage means, said second fluid passage means and said fluid-receiving means, respectively, and in communication therewith, and a relatively thick bottom lamination composed of said material, said top, intermediate and bottom laminations superposed to form a unitary hermetically sealed structure.

9. A device as defined in claim 8 wherein the fluid flow configuration comprising at least said first fluid passage means, said second fluid passage means, said chamber, said fluid-receiving means, and said identation means being totally enclosed within the boundary of the thin laminations.

10. A fluid-operated control device comprising first fluid passage means for generating a first jet of fluid, second fluid passage means for generating a second jet of fluid in a direction generally perpendicular to the direction of the first jet, third fluid passage means for generating a third jet of fluid, said third passage means terminating within said second passage means, a chamber adjacent the origin of a first, second, and third jet generated by said first, second, and third passage means, respectively, and defined by a pair of side walls, a first of said side walls in communication with said first passage means and having a first surface parallel to the centerline axis of said device and a downstream second surface disposed in diverging relationship to the centerline axis at a relatively small angle, a second of said side walls having a curved surface in communication with said second and third passage means and a downstream second surface disposed in diverging relationship to the centerline axis at a relatively large angle, said side walls establishing regions which effect attachment of a jet of fluid to said first side wall in the presence of a single one of the first, second, and third jets, a mere impingement upon said second side wall in the concurrent presence of the first jet and at least one of the second and third jets, a pair of spaced fluid-receiving passages downstream from said side walls for selectively receiving mutually exclusive fluid signals from jets associated with corresponding side walls of said chamber, a pair of oppositely disposed vent passages open at areas intermediate the side walls and receiving passages for relieving fluid pressure in said receiving passages, each of said vent passages having a pair of sidewalls with an upstream side wall thereof having a curved surface extending in a downstream direction at a first open end of the vent passage, and a barrier downstream from said chamber with an end face confronting said chamber, said barrier disposed symmetrically about the centerline axis of said device intermediated said fluid-receiving passages and comprising an indentation for receiving fluid from jets associated with the chamber side walls and creating a vortex of the received fluid flowing in a direction to maintain association of a jet of fluid with a selected side wall of said chamber, said identation being dimensioned such that at least a portion of fluid leaving the indentation enters the adjacent vent passages without becoming part of the vortex.

References Cited by the Applicant

UNITED STATES PATENTS

| | | | |
|---|---|---|---|
| 1,658,797 | 2/1928 | Charette et al. | |
| 3,107,850 | 10/1963 | Warren et al. ---- | 137—81.5 XR |
| 3,122,165 | 2/1964 | Horton ----------- | 137—81.5 |
| 3,181,546 | 5/1965 | Boothe ------------ | 137—81.5 |

FOREIGN PATENTS

| | | |
|---|---|---|
| 1,278,781 | 11/1961 | France. |
| 1,278,782 | 11/1961 | France. |

OTHER REFERENCES

"Fluid Jet Control Devices," A.S.M.E., Nov. 28, 1962, pp. 83, 84, FIG. 1. (Copy in Scientific Library.)

H.D.L. Report, TR 1114, Fluid Amplication, Logic Elements #9, E. V. Hobbs, Mar. 8, 1963, pp. 18, 21, 22, FIG. 10, 13 and 14. (Copy in Scientific Library and Group 360, 137–81.5.)

M. CARY NELSON, *Primary Examiner.*

S. SCOTT, *Asst. Examiner.*